M. G. FARMER.
Preventing Boiler-Incrustation.

No. 88,285.  Patented March 30, 1869.

Witnesses:
L. Fisher
Sarah J. Farmer

Inventor:
Moses G. Farmer

United States Patent Office.

MOSES G. FARMER, OF SALEM, MASSACHUSETTS.

Letters Patent No. 88,285, dated March 30, 1869.

IMPROVEMENT IN THE APPLICATION OF AN ELECTRICAL CURRENT TO STEAM-BOILERS.

The Schedule referred to in these Letters Patent and making part of the same.

To all persons whom it may concern:

Be it known that I, MOSES G. FARMER, of Salem, county of Essex, and State of Massachusetts, have invented a new and useful Improvement in Apparatus for the Prevention of the Corrosion of Steam-Boilers, and also the incrustation thereof; and I do hereby declare that the following is a full and exact description thereof, reference being had to the accompanying drawings and figures.

The object of my invention, is to hinder the corrosion of steam-boilers, or evaporating-vessels, and also to prevent the deposition thereon of earthy salts, in the form of incrustation.

It is a familiar fact, that if two plates of metal be suspended in an electrolytic liquid, and the two plates be connected with the poles of a powerful galvanic battery, magneto-electric machine, thermo-electric battery, or other source of electricity, the current will pass from one of the plates through the liquid, in such a manner as to effect the corrosion of one of the plates, and to tend to hinder the corrosion of the other.

In my present invention, I take advantage of this fact.

The several parts of my apparatus are represented in the accompanying drawings.

The insulation at $i$ may be effected by mica, ebonite, or any of the usual means.

Figure 2:
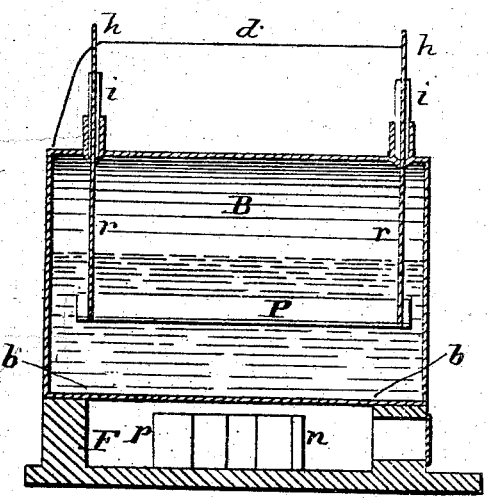
Figure 2 is a longitudinal section, showing, in addition, the wire $d$, connecting the two hooks, $h\ h$.
Figure 1:
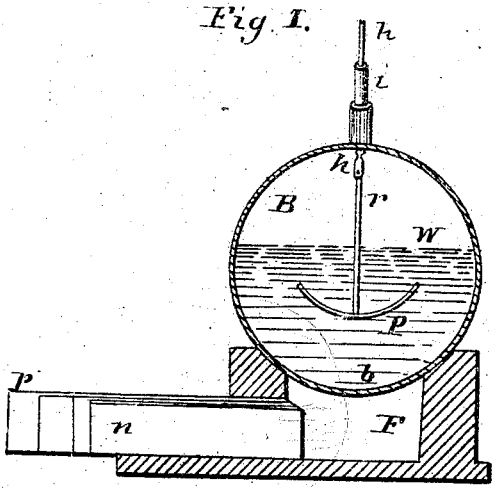
Figure 1 is a vertical cross-section, showing the furnace F, the thermo-battery $p\ n$, the shell $b$ of the boiler B, the suspended plate P, the water-line W, the connecting-rod $r$, the hook $h$, and the insulation $i$.

To construct and arrange my apparatus, I suspend a plate, of metal, preferably of iron, or support several plates within a boiler, as seen in the drawings, figs. 1 and 2. The plate or plates should be insulated from the boiler, and supported beneath the surface of the water.

One mode of supporting the plate or plates, may be by suspending them upon conducting-rods, or wires $r\ r$, which rods may pass through the shell of the boiler, being insulated therefrom, or they may be attached to hooks $h\ h$, which pass through the shell, and are insulated, as at $i$.

These hooks may be connected with one another by the wire $d$, and they are connected by the wire $w$ with the positive pole $p$ of the thermo-battery, or other source of electricity.

Figure 3:
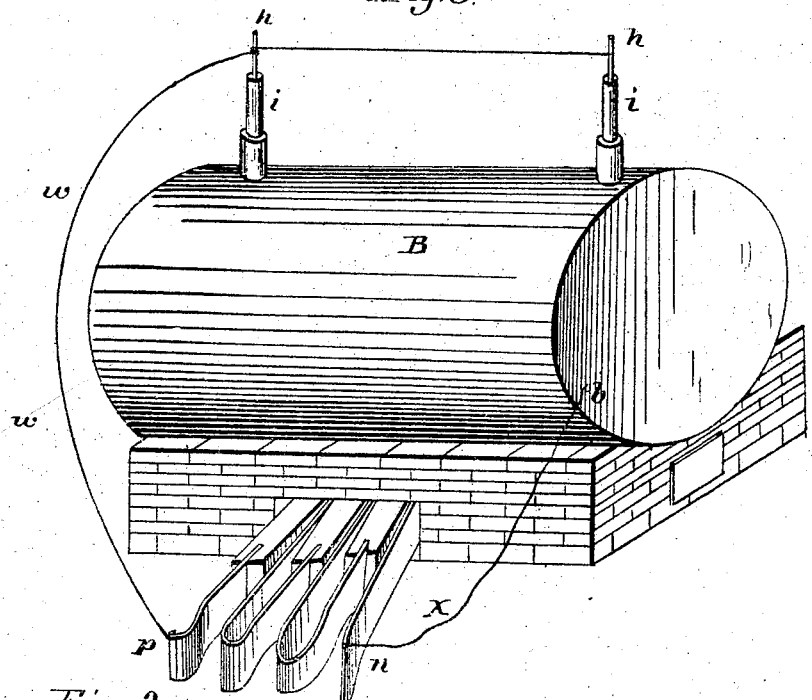
Figure 3 is a side view, showing the furnace F, the thermo-battery $p\ n$, the wires $w$ and $x$, the wire $d$, the top of the hooks $h\ h$, the insulation $i\ i$, and the boiler B.

The negative pole $n$ of the battery should be connected with the shell of the boiler, as shown by the wire $n\ x\ b$, fig. 3.

If, now, the boiler B be so far filled with water as to cover the plate P, and if the battery be put in action, a positive current will pass from the battery at $p$, by the wire $w$, insulated conductor $h\ r$, to the plate P; thence through the water $w$ to the shell of the boiler; thence by the wire $x$ to the negative pole of the battery, at $n$, and thus its circuit will be complete.

The action of the current will be to corrode the plate P, and to preserve the boiler B from corrosion.

The use of the thermo-battery is very convenient for this purpose, as it may be readily heated by the same furnace which heats the boiler, and thus the electricity be obtained at a trifling expense.

On locomotive-engines, a magneto-electric machine may be conveniently and economically applied, driven by a separate engine, or by the locomotive-engine itself.

Any of the common forms of magnets may be used. I should give the preference to a modification of Ladd's.

Thus, by the aid of electricity, the destructive action of impure water may be transferred from the shell and flues of a boiler to properly-suspended plates, which can easily be removed, and replaced by new ones, much more cheaply than the boiler can be renewed.

The current of electricity thus applied tends not only to hinder the corrosion of the boiler, but also to remove any incrustation which may have formed upon the inside of the boiler or upon its flues, and to prevent the formation of such scale, or incrustation, and this seems to be the result of a true electro-chemical, or electrolytic action.

The amount of electricity required varies with the amount of earthy and calcareous matter contained in the water, with the temperature of the inner boiler-surface, and the rate of evaporation.

In some cases, the electricity which will effect the corrosion of one square foot of suspended plate, to the amount of one pound per annum, will suffice. In other cases, much more electricity will be required. A little experience will determine.

It is obvious, that a number of separate plates may be suspended within the same boiler. Each plate might, if preferred, be connected with separated and independent batteries, and connected to the boiler at different places, as, for instance, at such points as where scale is most likely to form. Also, one battery may supply electricity to two or more boilers. Likewise, discontinuous, or secondary currents may be employed.

These variations do not affect the nature of my invention, which is to employ electricity to produce an electrolytic action within a boiler, directing the positive current from a suspended insulated, or supported conductor, through the water, from the suspended plate, or conductor, to the shell of the boiler, in such a manner as to corrode the suspended plate, and to hinder the corrosion of the boiler.

Having thus set forth my invention,

I claim, passing a current, or series of currents, of positive electricity, from a conductor of the same elec- trical character as the boiler-shell, and suspended in the water of the boiler, through the water, to the boiler-shell, by connecting the suspended conductor with the positive pole of a battery, or other source of electricity exterior to the boiler, while the boiler-shell is connected with the negative pole of said battery, the purpose being to prevent the corrosion and incrustation of the boiler, as specified.

I also claim the combination and arrangement described of the boiler B, plate P, insulating-supports $h$ $h$, and battery $p$ $n$, for the purpose set forth.

MOSES G. FARMER.

Witnesses:
J. FISHER,
CHARLES STOWELL.